United States Patent
Choi et al.

(10) Patent No.: US 7,019,802 B2
(45) Date of Patent: Mar. 28, 2006

(54) REFLECTIVE PLATE OF REFLECTIVE OR TRANSFLECTIVE LCD WITH IMPROVED REFLECTIVITY

(75) Inventors: Su Seok Choi, Gyeonggi-do (KR); Hyun Suk Jin, Gyeonggi-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 11/003,392

(22) Filed: Dec. 6, 2004

(65) Prior Publication Data

US 2005/0094065 A1    May 5, 2005

Related U.S. Application Data

(62) Division of application No. 10/607,240, filed on Jun. 27, 2003.

(30) Foreign Application Priority Data

Aug. 12, 2002 (KR) ............... 10-2002-0047449

(51) Int. Cl.
 *G02F 1/1335* (2006.01)
(52) U.S. Cl. ............................ 349/113

(58) Field of Classification Search ............ 349/113
See application file for complete search history.

(56) References Cited

U.S. PATENT DOCUMENTS

| | | | | |
|---|---|---|---|---|
| 5,204,765 A | * | 4/1993 | Mitsui et al. | 349/113 |
| 5,408,345 A | | 4/1995 | Mitsui et al. | |
| 5,500,750 A | | 3/1996 | Kanbe et al. | |
| 5,526,149 A | * | 6/1996 | Kanbe et al. | 349/113 |
| 5,610,741 A | * | 3/1997 | Kimura | 349/113 |
| 5,691,791 A | * | 11/1997 | Nakamura et al. | 349/113 |
| 6,097,458 A | | 8/2000 | Tsuda et al. | |
| 6,335,150 B1 | * | 1/2002 | Tsai | 430/321 |
| 6,452,653 B1 | | 9/2002 | Yamanaka et al. | |
| 2003/0086036 A1 | * | 5/2003 | Yang et al. | 349/113 |

* cited by examiner

*Primary Examiner*—Tarifur R. Chowdhury
(74) *Attorney, Agent, or Firm*—McKenna Long & Aldridge LLP

(57) ABSTRACT

Disclosed is a reflective plate of an LCD including a reflective surface, and a plurality of reflective bumps arranged the reflective surface, wherein each of the plurality of bumps forms a part of a sphere, wherein the bumps have a radius and a height, and wherein a ratio of the radius to the height for each of the bumps is a fixed value.

4 Claims, 10 Drawing Sheets

Fig.9D

REFLECTIVE PLATE OF REFLECTIVE OR TRANSFLECTIVE LCD WITH IMPROVED REFLECTIVITY

This application is a divisional of prior application Ser. No. 10/607,240, filed Jun. 27, 2003.

This application claims the benefit of Korean Patent Application No. 2002-47449, filed on Aug. 12, 2002, which is hereby incorporated by reference for all purposes as if fully set forth herein.

BACKGROUND OF THE INVENTION

1. Field of the Invention

The present invention relates to a reflective or transflective liquid crystal display (LCD) provided with a reflective plate having a surface with bumps, and a fabrication method thereof.

2. Description of the Related Art

In general, liquid crystal displays are divided into transmissive LCDs and reflective LCDs according to the type of the light source. The transmissive LCDs use a backlight as a light source while the reflective LCDs do not use a backlight, but use external light as the light source.

The transmissive LCD using the backlight as the light source displays a bright image even in a dark environment but has a disadvantage of high power consumption. On the other hand because the reflective LCD obtains light from external natural light or an artificial light, it has an advantage of a low power consumption compared with the transmissive LCD.

This advantage of the reflective LCD leads to the desirability of the reflective LCD. The reflective LCD, however, has a disadvantage in that it is difficult to use in a dark environment. To overcome this disadvantage, there is a need for a transflective LCD that can be used as both a reflective LCD and a transmissive LCD.

Figure 1A:
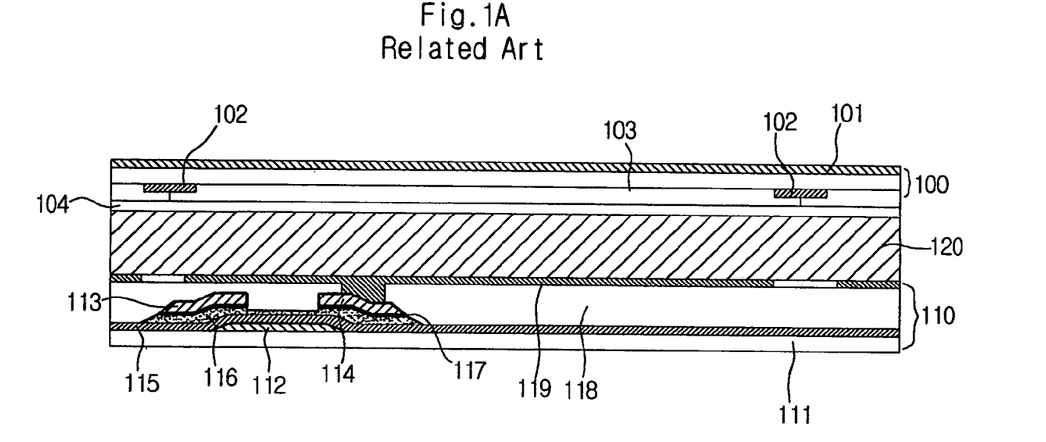
FIG. 1A is a sectional view of a reflective LCD according to the related art.
Figure 1B:
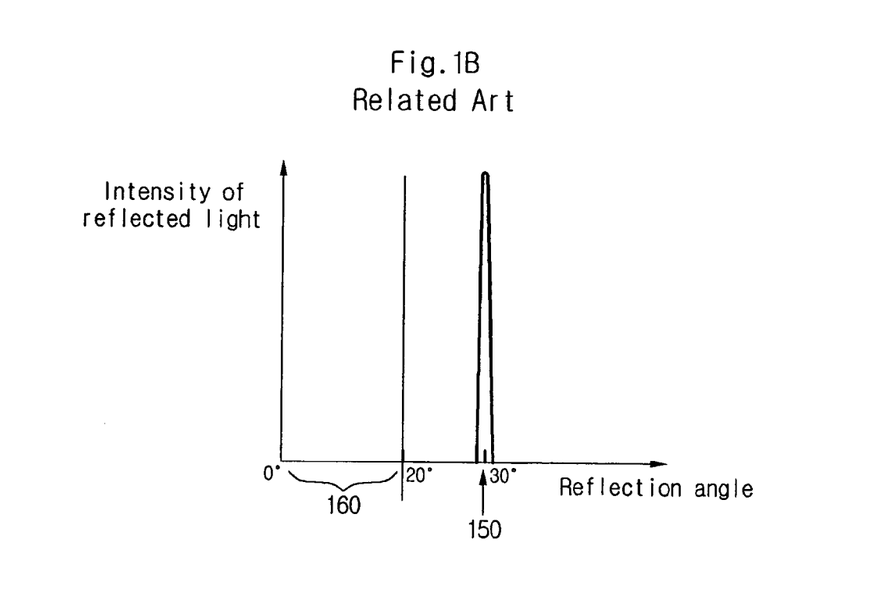
FIG. 1B is a graph showing a reflection angle characteristic of the reflective LCD shown in FIG. 1A.

FIG. 1A is a sectional view of a reflective LCD according to the related art and FIG. 1B is a graph showing a reflection angle characteristic of the reflective LCD shown in FIG. 1. An LCD according to the related art includes a lower substrate 110, an upper substrate 100 and a liquid crystal layer 120 interposed therebetween. The lower substrate 110 includes a lower base substrate 111, a gate electrode 112, a gate insulating layer 115, a semiconductor layer 116, an ohmic contact layer 117, a thin film transistor (TFT) including source and drain electrodes 113 and 114, an organic insulating layer 118 formed on the lower base substrate including the TFT, a reflective plate 119 formed on the organic insulating layer 118, and a lower alignment film (not shown) formed on the organic insulating layer 118 including the reflective plate 119.

The upper substrate 100 includes an upper base substrate 101, a black matrix 102 formed on an inner surface of the lower base substrate 101 corresponding to the TFT, a color filter 103 formed on both sides of the black matrix 102, a common electrode 104 formed on the black matrix 102 and the color filter 103, and an upper alignment film (not shown) formed on the common electrode 104. If the reflective plate 119 is formed of an opaque metal, it functions to reflect external light as well as a pixel electrode. On the contrary, if the reflective plate 119 is formed of ITO, i.e., a transparent electrode, it only functions as a pixel electrode to reflect external light without a function.

While FIG. 1B shows an example of how the reflective plate 119 reflects external light, it is also possible to form a separate pixel electrode.

However, the conventional reflective LCD as described above has a drawback in that its viewing angle characteristic is not good. If external light is incident into the upper substrate having a flat mirror type reflective plate with an incident angle of 'I', the external light is reflected with a reflection angle 'R' with respect to a normal line of the upper substrate via the reflective plate and the liquid crystal layer according to Fermat's principle. At this time, the reflecting light has the reflection angle 'R' that is the same magnitude as the incident angle 'I', but is opposite in sign and direction to the incident light.

From FIG. 1B shows the reflection angle characteristic of the conventional reflective LCD. The horizontal axis represents a reflection angle of external light and the vertical axis represents the intensity of the reflected light at each reflection angle. In a general reflective LCD, an incident angle of external light for example is −30°, and is reflected at a reflection angle 150 of 30°.

In the aforementioned conventional reflective LCD external light is reflected and concentrated toward the reflection angle 150. Thus, because the reflecting light is nearly reflected toward a front reflection angle range 160 of 0–20° which corresponds to a typical user viewing locations the reflective LCD fails to perform its role as a display.

Accordingly, there remains a need for a technique for reflecting external light with the front reflection angle ranging from 0 to 20° that is the typical user viewing location.

In order to overcome the problems with viewing angle in conventional reflective LCD's technique of forming a scattering particle layer in the upper substrate or in the color filter layer has been proposed. This techniques improves the viewing angle, but does not obtain a satisfactory viewing angle.

Another proposed technique, uses a reflective plate having a bump structure. This technique provides a reflective plate that is not a flat mirror type but has an embossed surface. By doing so, the reflected light is spead over a range of viewing angles.

Until now, the technique using the reflective plate having the bump structure has been widely used to improve the poor viewing angle of the conventional reflective LCD. Much research relating to methods for forming such a bump structure is under way.

Figure 2A:
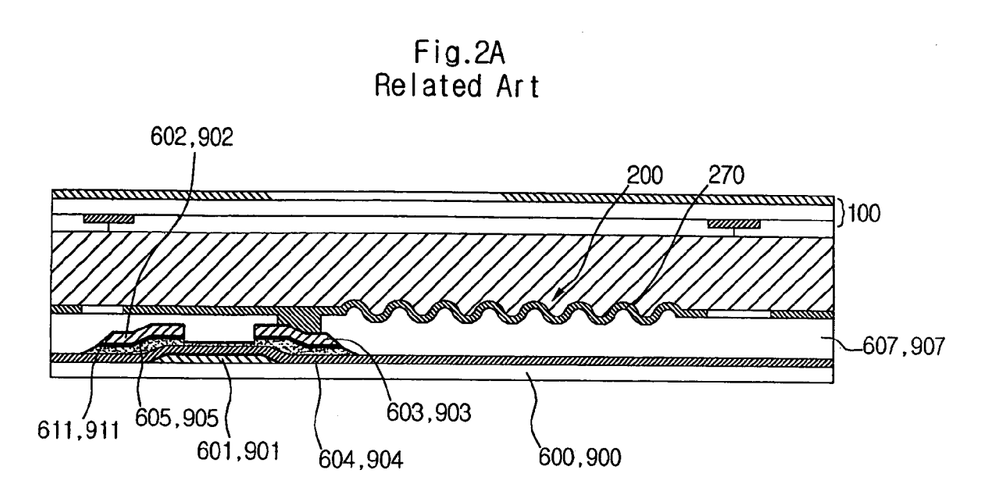
FIG. 2A is a sectional view of a reflective LCD employing a reflective plate having a bump structure according to the related art and FIG. 2B is a graph showing a reflection angle characteristic of the reflective LCD shown in FIG. 2A.
Figure 2B:
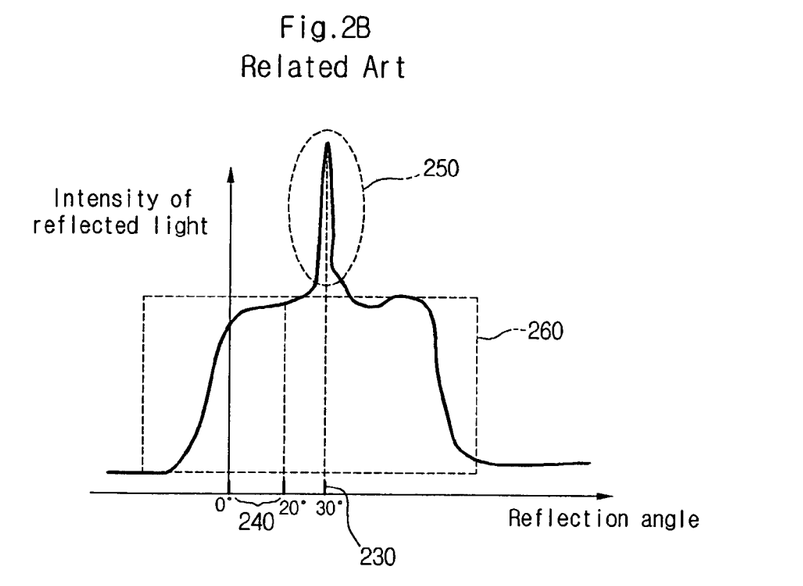

FIG. 2A is a sectional view of a reflective LCD employing a reflective plate having a bump structure according to the related art and FIG. 2B is a graph showing a reflection angle characteristic of the reflective LCD shown in FIG. 2A.

The reflective LCD employing a reflective plate 200 having a plurality of bumps 270 shown in FIG. 2A has a similar structure to that of FIG. 1 but has a difference in the shape of the reflective plates. In other words, the surface of the reflective plate 200 is not flat like a mirror has a regular configuration or a random configuration of bumps. Due to the existence of the bumps 270, external light that is incident with an incident angle 'I' is not reflected with a fixed reflection angle 'R' that is the same as the incident angle 'I'.

The graph of FIG. 2B shows the reflection angle characteristic of the reflective LCD employing the reflective plate 200 having the bumps 270. Like FIG. 1B shows the horizontal axis of FIG. 2B represents a reflection angle of the reflected light and the vertical axis represents the intensity of the reflected light.

A comparison of the graph of FIG. 2B with that of FIG. 1B shows that the reflection angle range of the reflected external light is widened. The reflected light corresponding to a reflection angle 230 is referred to as a 'reflection component' 250, and the reflected light that is widely distributed other than the reflection angle 230 is referred to as 'haze component' 260. The reflection component 250 has the greatest intensity. When the incident angle of the external light is −30°, the incident light is not just reflected at the reflection angle 230, but the reflecting light is also reflected toward the front reflection angles 240 ranging from 0–20° corresponding to the typical user location in front of the display.

Figure 3:
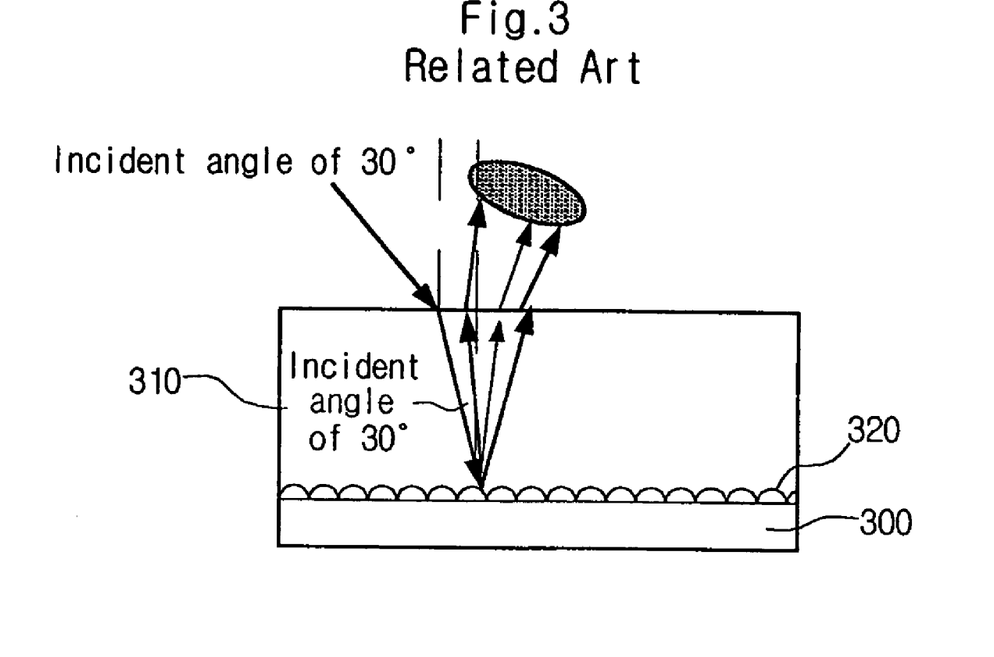
FIG. 3 is a schematic view showing scattering and reflection of external light in the reflective plate shown in FIG. 2A.

FIG. 3 is a schematic view showing scattering and reflection of external light in the reflective plate shown in FIG. 2A. Assuming that the refraction index in air is n1, and the value of n1 is 1. And, assuming that the refraction index of the liquid crystal layer 310, through which the external light passes the value of n2 is approximately 1.5.

According to Snell's law, when an incident angle of external light is 30°, a refracted angle is expressed by an equation of $\sin^{-1}(n1/n2 * \sin 30°)$. Hence, when n1=1, n2=1.5 in the above equation, the refractive angle is approximately 20°.

The light that is incident on the bumped surface 320 of the reflective plate 300 is reflected with a reflection angle with respect to the normal of the substrate according to Fermat's principle. The reflected light has the reflection angle that is the same in magnitude as the incident angle, but is opposite in its sign and direction to the incident light. Then, because the light that is incident onto the bumped surface 320 has different normal at different points of the bumped surface 320 and accordingly the reflection angle is not fixed at 20° but spreads over a range of reflection angles.

Accordingly, external light that an initial incident angle of 30° is diffused even towards the reflection angles ranging from 0–20° corresponding to the typical user viewing location and is reflected to improve the low luminance characteristic that is a disadvantage of the conventional mirror type reflective plate in the typical user viewing location.

However, by simply forming bumps in the reflective plate, it is difficult to achieve the uniformity that allows external light to be uniformly reflected toward the front reflection angle corresponding to the typical user viewing location. Also, there is a drawback in that the intensity of the light reflected toward the front reflection angle corresponding to the typical user viewing location is not sufficiently strong enough for satisfactory user viewing.

SUMMARY OF THE INVENTION

Accordingly, the present invention is directed to a reflective plate of a reflective LCD and fabrication method thereof that substantially obviates one or more problems due to limitations and disadvantages of the related art.

An advantage of the present invention is to provide a reflective plate of a reflective LCD and fabrication method, in which a plurality of bumps of which the shape is determined and the radius and height are controlled at constant values, is formed in the reflective plate to increase the reflection efficiency and reflection luminance with respect to the reflection angle.

Additional features and advantages of the invention will be set forth in the description which follows, and in part will be apparent from the description, or may be learned by practice of the invention. The objectives and other advantages of the invention will be realized and attained by the structure particular pointed out in the written description and claims hereof as well as the appended drawings.

To achieve these and other advantages and in accordance with the purpose of the invention, as embodied and broadly described herein, there is provided a reflective plate of an LCD including a reflective surface, and a plurality of reflective bumps arranged the reflective surface, wherein each of the plurality of bumps forms a part of a sphere, wherein the bumps have a radius and a height, and wherein a ratio of the radius to the height for each of the bumps is a fixed value.

In another aspect of the present invention, there is provided a reflective plate for an LCD including a reflective surface, and a plurality of reflective bumps arranged on the reflective surface, and wherein the reflective bumps have a profile function defining the shape of the bump, wherein the profile function comprises inflection points, a circular arc portion above the inflection points extending away from the surface, and circular arc portions that extend toward the reflective surface below the inflection points between the inflection points and the reflective surface.

In another aspect of the present invention, there is provided a method for fabricating a reflective plate of an LCD, the method including the steps of depositing a first photosensitive organic insulating layer on an entire surface of an insulating substrate on which a switching device including a source electrode, a drain electrode and a gate electrode is formed, at a predetermined thickness, exposing and etching the first organic insulating layer by using a mask having a light transmitting region to form a plurality of bumps each having a partial sphere shape, wherein the ration of a radius to the height of the bump is a fixed value for each of the bumps, and depositing a reflective metal on the first organic insulating layer having the plurality of bumps.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principle of the invention. In the drawings.

DETAILED DESCRIPTION OF THE INVENTION

Figure 4:
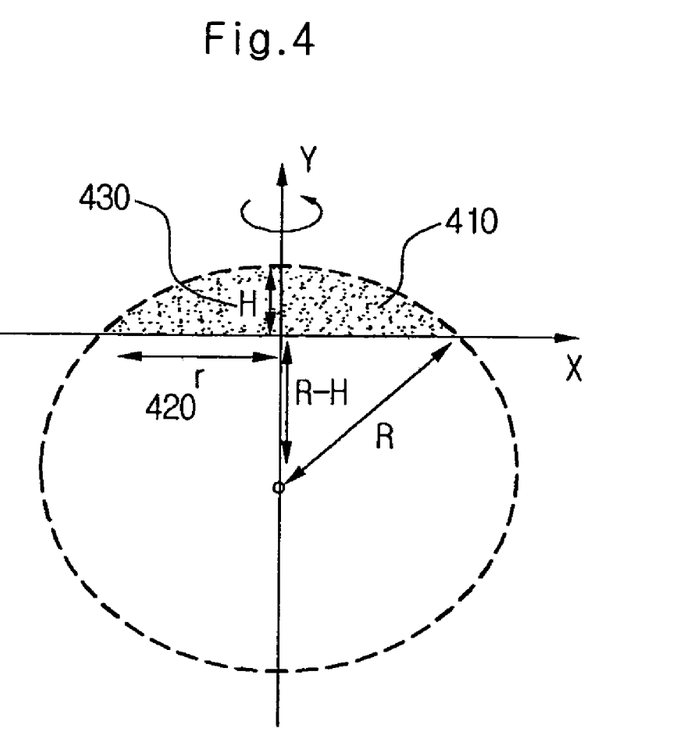
FIG. 4 is a sectional view of a bump formed on a reflective plate according to an embodiment of the present invention.

FIG. 4 is a sectional view of a bump formed on a reflective plate according to an embodiment of the present invention. The bump may be expressed by a profile function, and the profile function determines the intensity of reflected light depending on a reflection angle. In other words, it is important to obtain a shape of the bump allowing a uniform distribution of reflected light within a viewing angle range, and thereby the distribution and intensity of the reflected light are determined.

The profile function of the bump forms a part of a shape which may be rotated to define the bump shape. A circle, an ellipse, a parabola, a hyperbola or the like may be used as a profile function.

The shape and the profile function of the bump formed in a reflective plate will be described according to an embodiment of the present invention with reference to FIG. 4.

The bump 410 according to an embodiment of the present invention forms a part of a circular rotational body, i.e., a sphere. Assuming that the horizontal axis is the x-axis and the vertical axis is the Y-axis, the center of a circle prior to a rotation is (0, R–H) and a radius is an R. Accordingly, the circle has an equation of $x^2+\{y-(R-H)\}^2=R^2$.

Here, a dark portion subtended by the x-axis becomes a section of the bump 410 that is the shape prior to the rotation of the bump 410. Accordingly, a rotational body of the section corresponds to the shape of the bump 410, and a rotational function of the section becomes the profile function of the bump 410. As a result, the shape of the bump 410 constitutes a part of the sphere such that the reflection characteristic of the reflected light within a viewing angle has a uniform distribution.

Also, the shape and the profile function of the bump 410 are varied with the radius 'r' 420 to and the height 'H' 430 of the bump 410, and by a ratio of the radius 'r' 420 to the height 'H' 430, it is possible to control the reflectivity so that it is uniform over a desired reflection angle range corresponding to a typical user viewing location such as 0–20°. When the ratio of the radius 'r' 420 to the height 'H' 430 of the bump is in the range from 20:1 to 7:1 and the radius 'r' 420 is between 3 μm and 20 μm, the aforementioned effect may be obtained.

Figure 5A:
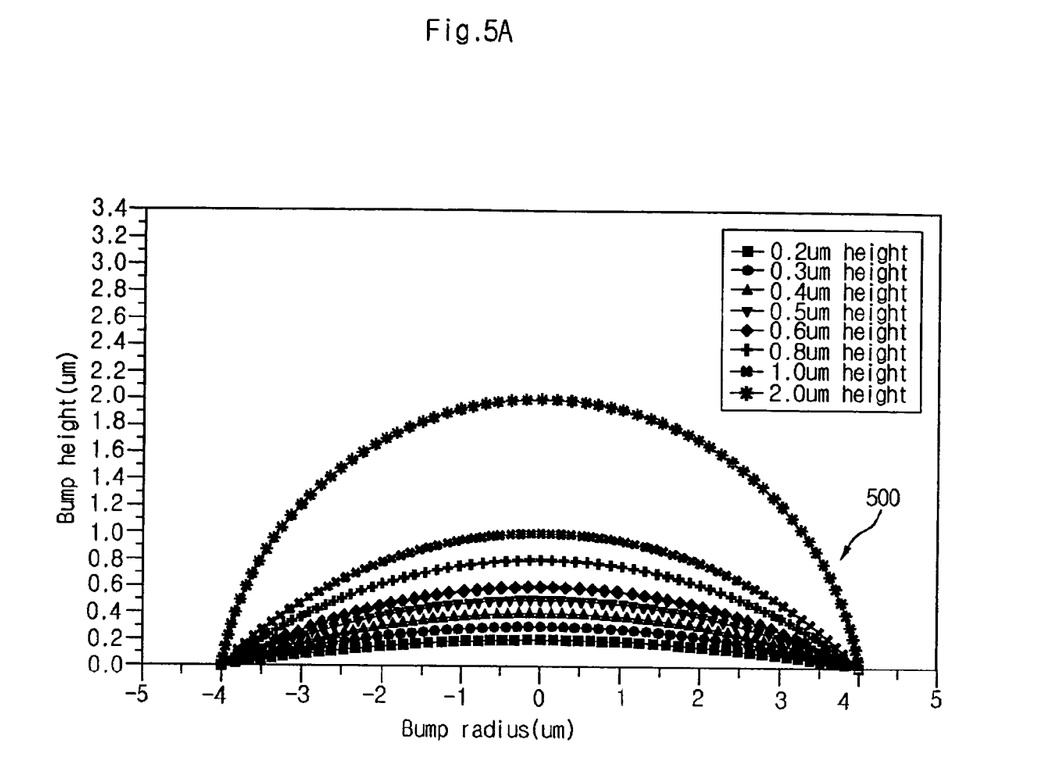
FIG. 5A shows profiles of a reflective plate of bumps for various heights and radii of the bumps according to an embodiment of the present invention.
Figure 5B:
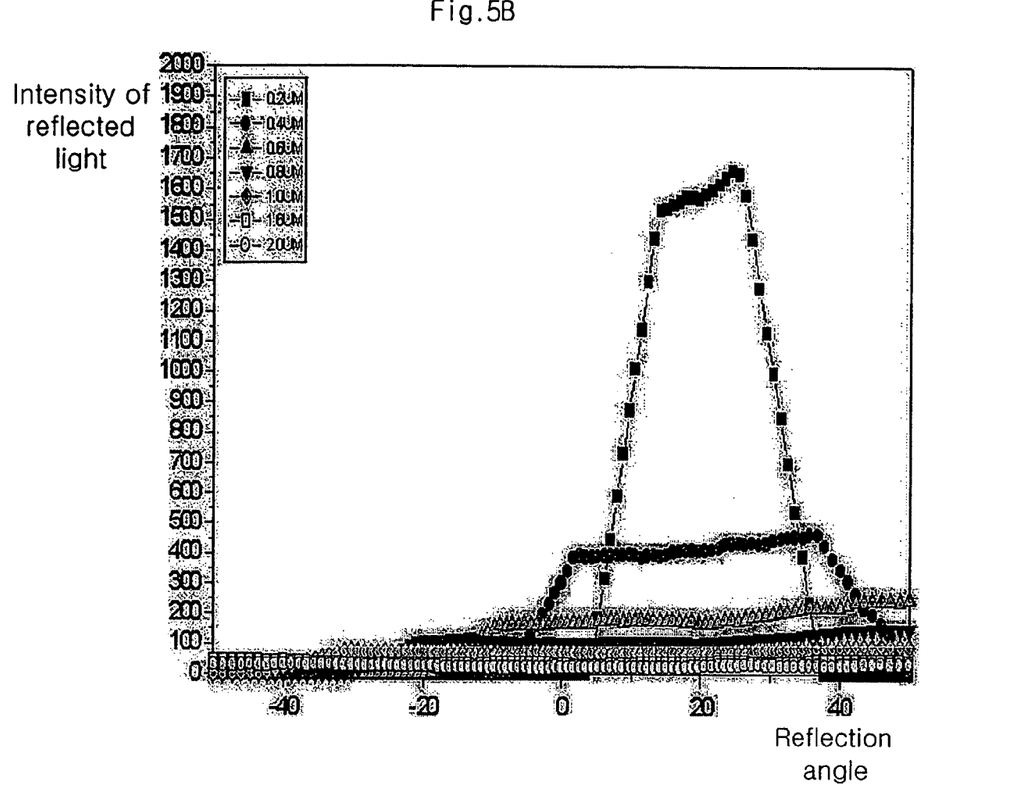
FIG. 5B is a graph showing the intensity of the reflected light versus reflection angle in a reflective plate according to an embodiment of the present invention.

FIG. 5A shows profiles of bumps of a reflective plate for various heights and radii of the bumps according to an embodiment of the present invention; FIG. 5B is a graph showing the intensity of the reflected light versus reflection angle in a reflective plate according to an embodiment of the present invention. In FIGS. 5A and 5B, while the radius of the bump is set to 4 μm and the height is controlled according to the ratio of the radius to the height, the radius is not limited only to this value, but may take on other values as well.

Referring to FIG. 5A, the horizontal axis represents the radius of the bump, and the vertical axis represents the height of the bump. In other words, FIG. 5A corresponds to various profiles of bumps 500 according to the present invention.

Each of the profiles of the bumps 500 according to the invention constitutes a part of a circle. If the height 'H' of the bump 500 is fixed by 'r' and a constant ratio of the r and the H, the radius 'R' of a circle is obtained from the Pythagorean theorem, and accordingly the shape of the circle is determined. For instance, when 'r' is 4 μm and the ratio of 'r' to 'H' is 10:1, the value of 'H' is 0.4 μm. Accordingly, the radius 'R' of the circle including the bump 500 may be obtained from the equation $R=(r^2+H^2)/2H$ by substituting predetermined values for the variables r and H. In this example, the value of 'R' is 20.2 μm. Once the value of 'R' is obtained, the equation of the circle is determined, so that the shape and profile function of the bump 500 that is a rotation of a part of the circle are fixed.

Specifically, FIG. 5A shows profiles of the bumps 500 when 'r' is 4 μm and the ratio of 'r' to 'H' ranges from 20:1 to 2:1, and FIG. 5B shows a plot of reflected light intensity versus reflection angle for different ratios of 'r' to 'H' in FIG. 5A.

Referring to FIG. 5B, it is possible to see the uniformity of the reflected light versus the reflection angle according to an object of the invention. When the ratio of 'r' to 'H' in the bump is 10:1 as shown in FIG. 5B, the reflected light intensity is very uniform. Accordingly, the bump of the reflective plate of the present invention has an optimum structure when the ratio of 'r' to 'H' of the bump is 10:1.

While the embodiment of FIGS. 5A and 5B shows that the radius 'r' of the bump is fixed and the height 'H' varies according to the ratio of 'r' to 'H', it is also possible to fix the height 'H' and the radius 'r' is determined by the ratio of 'r' to 'H'.

FIGS. 6A to 6D are sectional views illustrating a fabrication process of the reflective plate with the plurality of bumps shown in FIG. 4. Hereinafter, a fabrication process of the reflective plate having a plurality of bumps shown in FIG. 4 will be described with reference to FIGS. 6A to 6D. A metal layer is deposited on a lower base substrate 600 and then patterned to form a gate electrode 601 and a gate line (not shown) along with a storage electrode pattern (not shown). A gate insulating layer 604 is formed on an entire surface of the resultant substrate 600 including the gate electrode 601, the gate line and the storage electrode pattern. The gate insulating layer may be silicon nitride ($Si_xN_y$) or silicon oxide ($SiO_2$) and maybe formed by a plasma chemical vapor deposition (CVD). Afterwards, a semiconductor layer 611 and an ohmic contact layer 605 are formed, and then metallic source electrode 602 and drain electrode 603 that are ohmic-contacted with the ohmic contact layer 605 and the data line are formed. Through the above processes, a thin film transistor is formed.

Figure 6A:
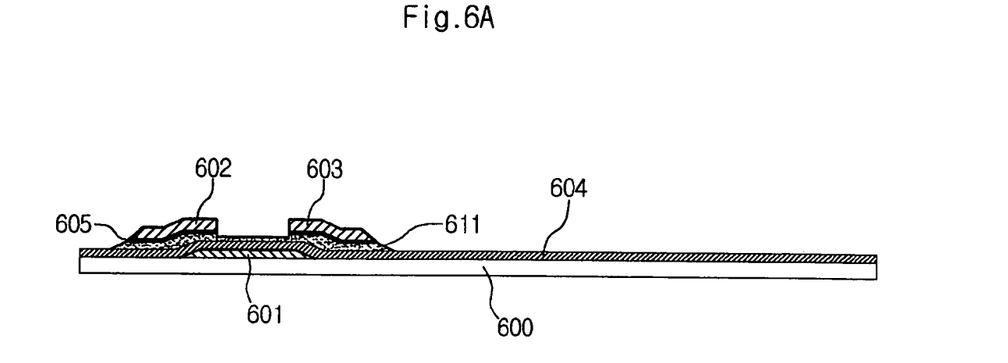
FIGS. 6A to 6D are sectional views illustrating a fabrication process of the reflective plate with the plurality of bumps shown in FIG. 4.
Figure 6B:
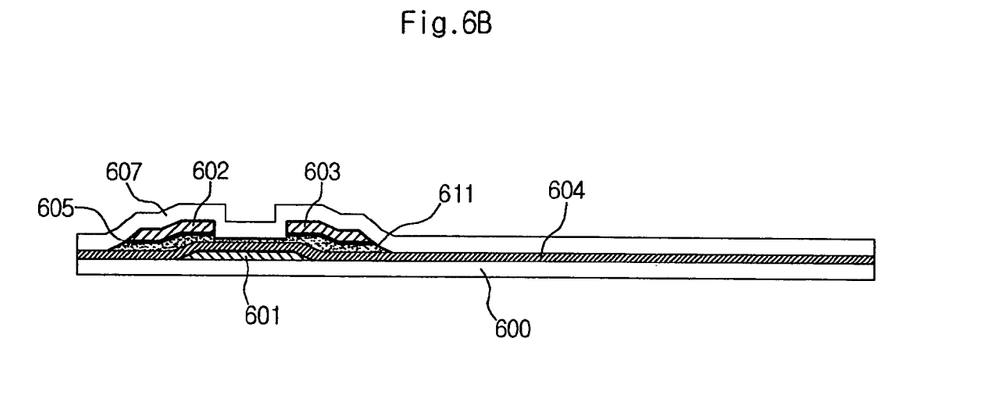

Next, referring to FIG. 6B, a photosensitive organic insulating layer 607 is formed on the resultant substrate on which the thin film transistor is formed by a coating process or the like with a predetermined thickness. In the organic insulating layer, the bumps are formed. As described in FIGS. 4 and 5, the radius and height of the bumps, and the ratio of the radius to the height are fixed at constant values. In other words, the ratio of the radius 'r' of the bump to the height 'H' is ranges from 20:1 to 7:1, and the radius 'r' of the bump ranges from 3 μm to 20 μm. Because the thickness of the organic insulating layer 607 formed by the initial coating process becomes the height of the bump, these values should be controlled with respect to the aforementioned condition.

Figure 6C:
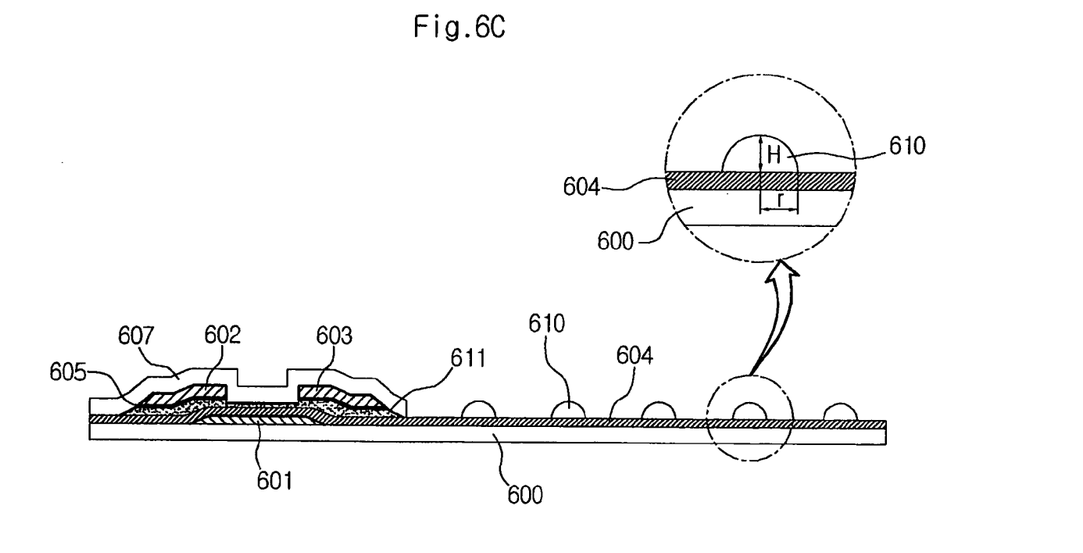

Thus, if the organic insulating layer 607 having a constant thickness is formed, the height of the bumps 610 is determined as shown in FIG. 6C. Also, if the ratio of the radius of the bump 610 to the height 'H' is fixed, the radius of the bump 610 is determined and accordingly the bump 610 having the aforementioned shape is formed by a photolithography process including an exposure step and an etch step. The bumps 610 formed in the organic insulating layer may be arranged in a regular configuration or a random configuration. The organic insulating layer is of one material selected from a group consisting of BCB, Acryl, Aerogel, and microfoam.

Figure 6D:
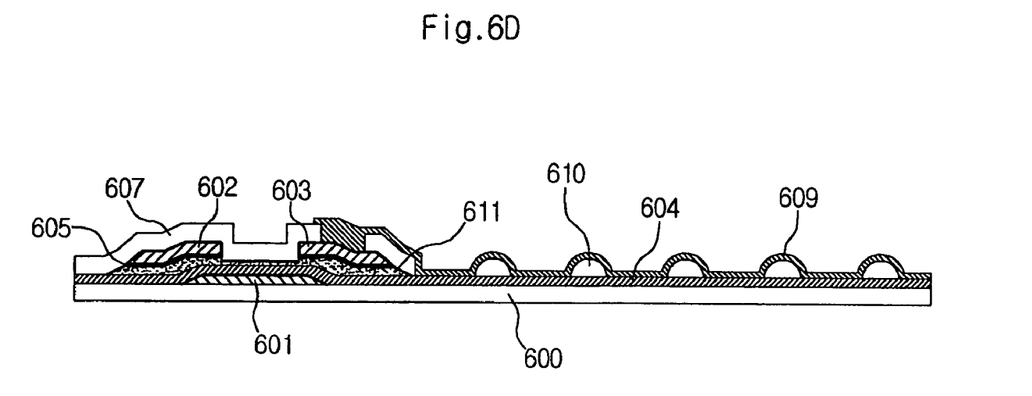

Next, as shown in FIG. 6D, a metal layer is deposited by sputtering on the organic insulating layer 607 with the bump structure to form a reflective plate 609. The metal layer may be aluminum which has outstanding reflectivity at the boundary with the deposition of the metal layer, the reflective plate 609 having a plurality of bumps 610 is formed.

The reflective plate 609 performs the function of reflecting external light as well as the function of a pixel electrode. However, as described in the related art, it is possible to form a separate pixel electrode besides the reflective plate 609. Also, when the reflective plate functions as the pixel electrode, it is electrically connected with the drain electrode 603.

Figure 7:
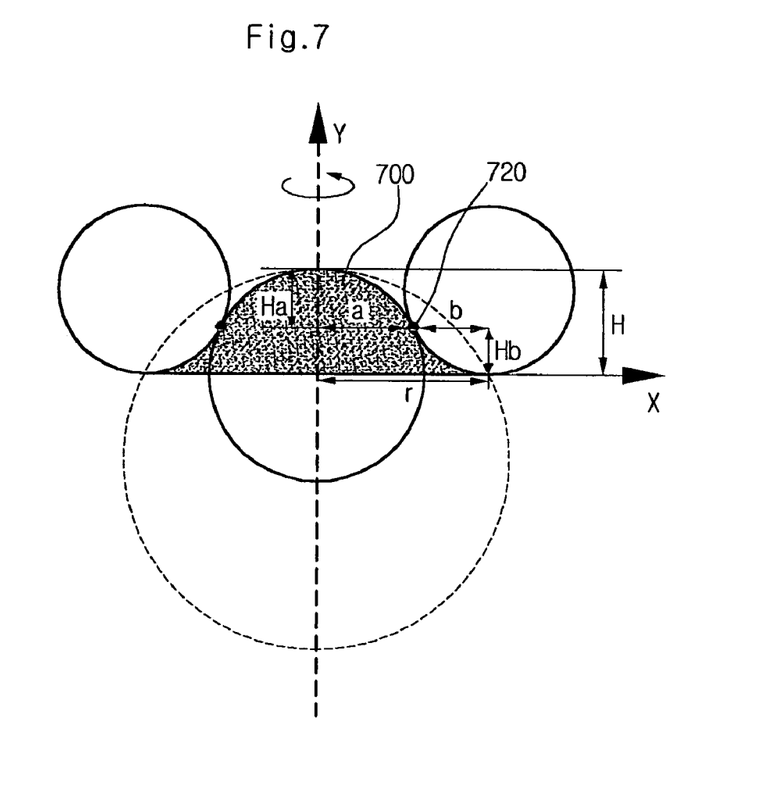
FIG. 7 is a sectional view of a bump formed in a reflective plate according to another embodiment of the present invention.

FIG. 7 is a sectional view of a bump formed in a reflective plate according to another embodiment of the present invention. FIG. 7 shows that an inflection point of a profile function of the bumps is generated by the melting cure characteristic of the organic insulating layer forming the bumps. The profile of a bump 700 may be divided into an upper portion and a lower portion on the basis of inflection points 720 generated by circles that are in contact with the profile of the bump 700. This profile of the bump is different than the bump of the embodiment described in FIGS. 4 and 5. In other words, the upper portion consists of a part of a circle that corresponds to the upper side of the inflection points 720 while the lower portion consists of a part of the circle that corresponds to the lower side of the inflection points 720. Finally, the dark portion shown in FIG. 7 becomes the profile of the bump 700, a rotational body of the dark portion constitutes the shape of the bump 700, and a function of the rotational body becomes a profile function of the bump 700. In other words, the upper portion of the bump 700 is a partial inner portion of a sphere corresponding to the upper side of the inflection points 720 while the lower portion of the bump 700 includes a partial outer portion of a sphere corresponding to the lower side of the inflection points 720. The profile of the bump 700 may also be described as having a circular arch portion extending away from the surface above the inflection points 720 and two circular arc portions extending toward the surface between the inflection points 720 and the reflective surface.

The distance between the inflection point 720 and the Y-axis is 'a', which is the radius of the bump 700 about the Y-axis at the inflection point 720. The distance along the x-axis between the inflection point 720 and center of the circle defining the portion of the bump below the inflection point 720. The distance along the Y-axis between the inflection point 720 and the top of the bump is 'Ha' and between the inflection point 720 and the bottom of the bump is 'Hb'. Therefore, the radius 'r' of the bump is 'a+b', and the height 'H' of the bump is 'Ha+Hb'

The ratio of 'r' to 'H' ranges from 20:1 to 7:1. Hence, the aforementioned effect may be obtained when the size of the radius 'r' of the bump 700 ranges from 3 μm to 20 μm.

Another condition on the bump is that the ratio of the volume of the bump above the inflection point 720 to the overall volume of the bump 700 ranges from 50% to 100%. This indicates that the ratio of the height 'H' to the height 'Ha' ranges from 2:1 to 1:1.

Note that when the ratio 'H:Ha=1:1', the profile of the bump is made by only one circle and this bump corresponds to the bump of FIGS. 4 and 5 in its shape and profile function.

Figure 8:
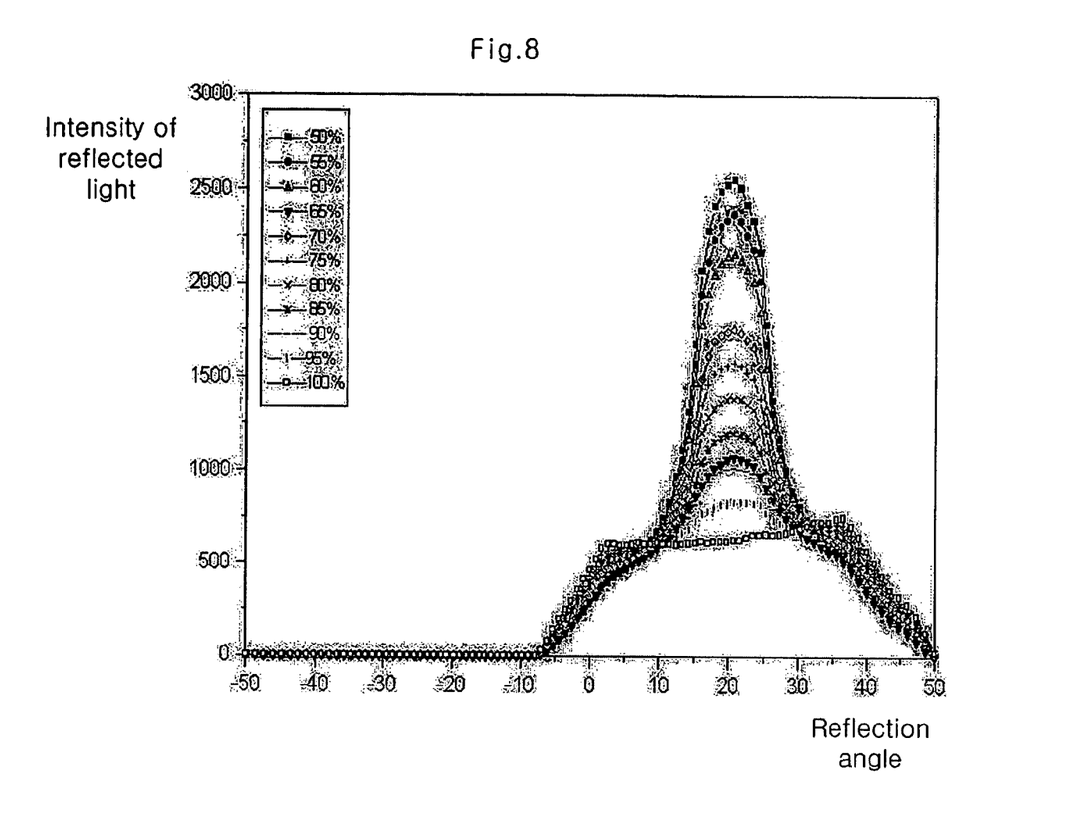
FIG. 8 is a graph showing reflected light intensity verses the reflection angle characteristic for various values of the ratio of H to Ha in the embodiment of FIG. 7.

FIG. 8 is a graph showing reflected light intensity versus the reflection angle for various value of the ratio of H to Ha in the embodiment of FIG. 7. In FIG. 8, the horizontal axis represents a reflection angle of external light and the vertical axis represents the reflected light intensity.

As the ratio of H:Ha increases from 2:1 to 1:1, the reflected light intensity becomes more uniform for the reflection angles for a typical user location.

In the present invention the ratio of 'r' to 'H' ranges from 20:1 to 7:1. The drawing shown in FIG. 7 corresponds to the ratio of 10:1.

FIGS. 9A to 9D are sectional views illustrating a fabrication process of the reflective plate with the plurality of bumps shown in FIG. 7. A fabrication process of the reflective plate having a plurality of bumps shown in FIG. 7 will be described with reference to FIGS. 9A to 9D.

Figure 9A:
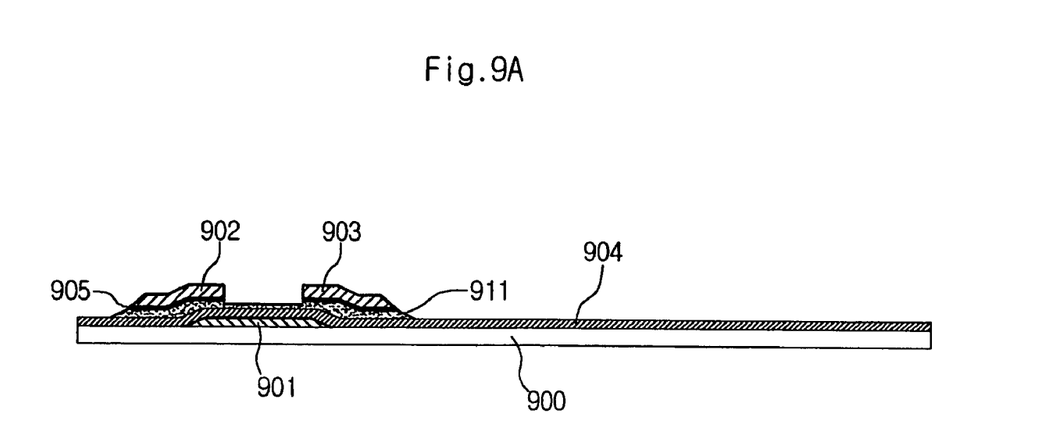
FIGS. 9A to 9D are sectional views illustrating a fabrication process of the reflective plate with the plurality of bumps shown in FIG. 7.

Referring to FIG. 9A, a metal layer is deposited on a lower base substrate 900 and then patterned to form a gate electrode 901 and a gate line (not shown) along with a storage electrode pattern (not shown). A gate insulating layer 904 is formed on an entire surface of the resultant substrate 900 including the gate electrode 901, the gate line and the storage electrode pattern. The gate insulating layer may be silicon nitride ($Si_xN_y$) or silicon oxide ($SiO_2$) and formed by a plasma chemical vapor deposition (CVD). Afterwards, a semiconductor layer 911 and an ohmic contact layer 905 are sequentially formed, and then a metallic source electrode 902 and a drain electrode 903 that are ohmic-contacted with the ohmic contact layer 905, and data line are formed. This process results in a thin film transistor being formed.

Figure 9B:
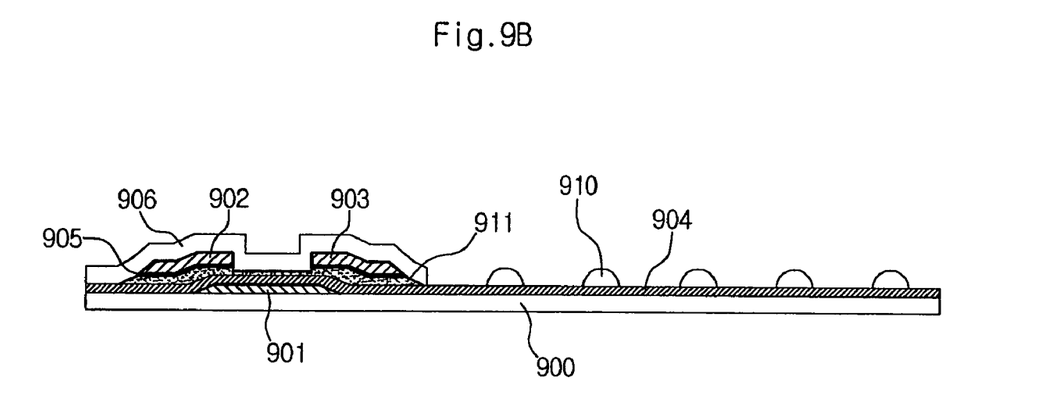

Next, referring to FIG. 9B, a photosensitive organic insulating layer (hereinafter referred to as 'first organic insulating layer) 906 is formed on the resultant substrate on which the thin film transistor is formed, by a coating process or the like at a predetermined thickness. Thereafter, the first organic insulating layer 900 is subject to a photolithography process including an exposure process and an etch process to form a plurality of bumps 912 on an upper surface thereof.

The aforementioned step of forming the bumps is different than that in the embodiment of FIGS. 6B and 6C. In other words, the embodiment of FIGS. 6B and 6C forms the bumps according to the radius, height, and ratio of the bumps that are determined constantly as described in FIGS. 4 and 5, while the embodiment of FIG. 9B forms the bumps 912 without any consideration of the radius, height and ratio of the bumps.

Figure 9C:
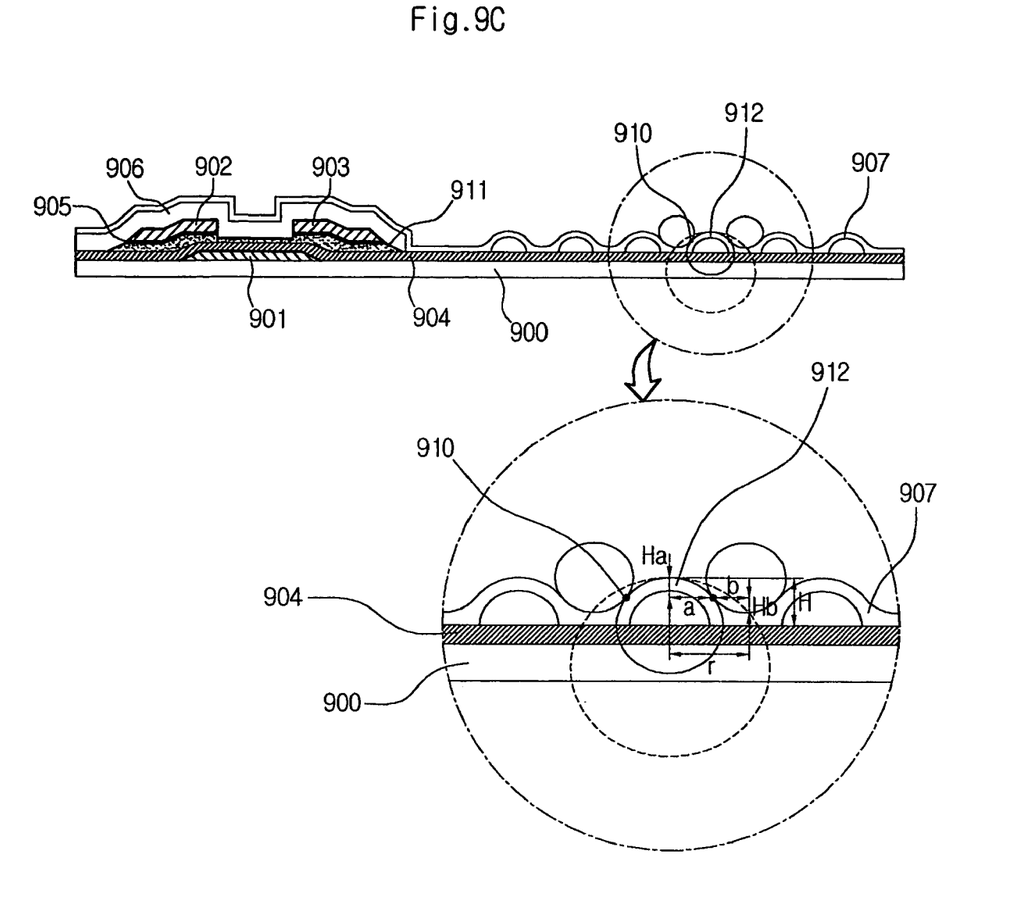

Next, referring to FIG. 9C, a photosensitive organic insulating layer (hereinafter referred to as 'second organic insulating layer) 907 is formed on the first organic insulating layer 906 having the bumps 912. The final shape of the bumps 912 is determined by the melting cure characteristic of the second organic insulating layer 907.

As described in FIG. 7, the section of the bump 912 may be divided into an upper portion and a lower portion upon considering that inflection points 910 of a bump profile function are generated by the melting cure characteristic of the organic insulating layer 907 on the basis of the inflection points 910 generated by circles that are in contact with the profile of the bump 912. The upper portion of the bump forms of a part of a circle that corresponds to the upper side of the inflection points 910 while the lower portion forms of a part of the circle that corresponds to the lower side of the inflection points 910.

The distance between the inflection point 920 and the Y-axis is 'a', which is the radius of the bump 900 about the Y-axis at the inflection point 920. The distance along the x-axis between the inflection point 920 and center of the circle defining the portion of the bump below the inflection point 920. The distance along the Y-axis between the inflection point 720 and the top of the bump is 'Ha' and between the inflection point 920 and the bottom of the bump is 'Hb'. Therefore, the radius 'r' of the bump is 'a+b', and the height 'H' of the bump is 'Ha+Hb'.

The ration of the radius 'r' to he height 'H' ranges from 20:1 to 7:1, and the radius 'r' of the bump ranges from 3 µm to 20 µm.

Another condition on the bump is that the ratio of the volume of the bump above the inflection point 920 to the overall volume of the bump 900 ranges from 50% to 100%. This indicates that the ratio of the height 'H' to the height 'Ha' ranges from 2:1 to 1:1.

The bumps 912 formed in the organic insulating layer 907 may be arranged in a regular configuration or a random configuration, and the organic insulating layers 906, 907 is of one material selected from a group consisting of BCB, Acryl, Aerogel and microfoam. Also, the first organic insulating layer 906 and the second organic insulating layer 907 may be formed of the same material.

Figure 9D:
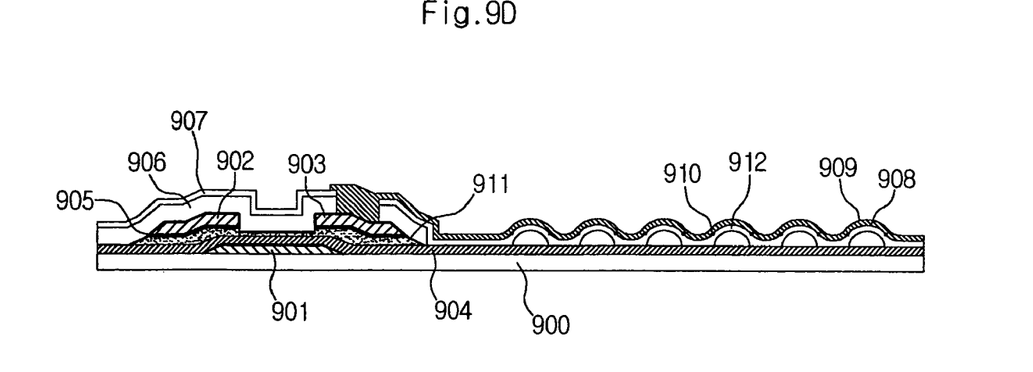

Next, referring to FIG. 9D, a metal layer is deposited on the second organic insulating layer 907 with the bump structure, by a sputtering to form a reflective plate 909.

The metal layer maybe aluminum which has outstanding reflectivity at the boundary with the deposition of the metal layer, the reflective plate 909 having a plurality of bumps is formed.

The reflective plate 909 performs the function of reflecting external light as well as the function of a pixel electrode. However, as described with reference to FIG. 6D, it is possible to form a separate pixel electrode besides the reflective plate 909. When, in case the reflective plate 909 functions as the pixel electrode, it is electrically connected with the drain electrode 903.

As described previously, in a reflective plate of a reflective LCD and a fabrication method thereof according to the present invention, the uniformity of the reflectivity that allows external light to be reflected with a constant efficiency at a front reflection angle corresponding to a typical user viewing location. Also, the intensity of the light reflected at the front reflection angles is increased to improve user viewing at those angles.

It will be apparent to those skilled in the art that various modifications and variations may be made in the present invention. Thus, it is intended that the present invention covers the modifications and variations of this invention provided they come within the scope of the appended claims and their equivalents.

What is claimed is:

1. A reflective plate for an LCD comprising:
   a reflective surface; and
   a plurality of bumps arranged on the reflective surface, wherein each of the bumps within the plurality of bumps has a profile function defining its shape;
   wherein the profile function includes:
      inflection points;
      a circular arc portion above the inflection points extending away from the reflective surface; and
      circular arc portions that extend toward the reflective surface below the inflection points between the inflection points and the reflective surface, wherein each bump in the plurality has a first height Ha that is the height of the bump above the inflection points and a second height Hb that is the height of the bump below the inflection points, and wherein the ratio (Ha+Hb) to Ha ranges from 2:1 to 1:1.

2. The reflective plate according to claim 1, wherein the radius of the bump ranges from 3 µm to 20 µm.

3. The reflective plate according to claim 1, wherein the bump has a height and a radius and wherein a ratio of the radius to the height of the bumps ranges between 20:1 and 7:1.

4. The reflective plate according to claim 3, wherein the ratio of the radius to the height of the bump is about 10:1.

* * * * *